United States Patent
Hsu et al.

(10) Patent No.: US 10,503,893 B2
(45) Date of Patent: Dec. 10, 2019

(54) SECURITY CERTIFICATE MANAGEMENT METHOD FOR A VEHICULAR NETWORK NODE AND VEHICULAR NETWORK NODE APPLYING THE SAME

(71) Applicant: INDUSTRIAL TECHNOLOGY RESEARCH INSTITUTE, Hsinchu (TW)

(72) Inventors: Chia-Chang Hsu, Taoyuan (TW); Pei-Chuan Tsai, Hsinchu County (TW); Huei-Ru Tseng, New Taipei (TW); Jing-Shyang Hwu, Zhubei (TW); Ping-Ta Tsai, Kaohsiung (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 244 days.

(21) Appl. No.: 15/392,206

(22) Filed: Dec. 28, 2016

(65) Prior Publication Data
US 2017/0277884 A1 Sep. 28, 2017

(30) Foreign Application Priority Data
Mar. 23, 2016 (TW) .............................. 105109055 A

(51) Int. Cl.
G06F 21/45 (2013.01)
H04L 29/06 (2006.01)
H04W 12/06 (2009.01)

(52) U.S. Cl.
CPC .......... *G06F 21/45* (2013.01); *H04L 63/0823* (2013.01); *H04W 12/06* (2013.01)

(58) Field of Classification Search
CPC .......... G06F 21/45; G06F 21/64; H04W 4/44; H04W 12/06; H04L 9/3268; H04L 63/0823; H04L 2209/84
See application file for complete search history.

(56) References Cited

U.S. PATENT DOCUMENTS

| | | | |
|---|---|---|---|
| 5,699,431 A | 12/1997 | Van Oorschot et al. | |
| 6,301,659 B1 | 10/2001 | Micali | |

(Continued)

FOREIGN PATENT DOCUMENTS

| | | |
|---|---|---|
| CN | 102906755 A | 1/2013 |
| CN | 103051726 | 4/2013 |

(Continued)

OTHER PUBLICATIONS

Rongxing Lu, et al., "ECPP: Efficient Conditional Privacy Preservation Protocol for Secure Vehicular Communications." *IEEE INFOCOM 2008 proceedings*, pp. 1903-1911.

(Continued)

*Primary Examiner* — Sher A Khan
(74) *Attorney, Agent, or Firm* — Muncy, Geissler, Olds & Lowe, P.C.

(57) ABSTRACT

A security certificate management method for a vehicular network node is applied in a vehicular network. A message is received. Whether a certificate in the message is revoked is determined. If the certificate in the message is revoked, a regional certificate revocation list (RCRL) is generated or updated based on the revoked certificate by the vehicular network node, and the RCRL is transmitted into a communication range of the vehicular network node.

16 Claims, 8 Drawing Sheets

(56) References Cited

U.S. PATENT DOCUMENTS

| | | | |
|---|---|---|---|
| 6,950,934 B2 | 9/2005 | Kang et al. | |
| 7,761,467 B2 | 7/2010 | Xu et al. | |
| 7,814,315 B2 | 10/2010 | Parkinson | |
| 7,827,401 B2 | 11/2010 | Micali | |
| 7,957,989 B2* | 6/2011 | Kennedy | G06Q 10/10 705/5 |
| 8,090,949 B2 | 1/2012 | Bellur et al. | |
| 8,307,414 B2 | 11/2012 | Zerfos et al. | |
| 8,347,088 B2* | 1/2013 | Moore | G06Q 50/00 713/166 |
| 8,363,832 B2 | 1/2013 | Di Crescenzo et al. | |
| 8,438,388 B2 | 5/2013 | Thomas et al. | |
| 8,549,284 B1 | 10/2013 | Kherani | |
| 8,819,414 B2* | 8/2014 | Bellur | H04L 9/3273 713/155 |
| 9,083,535 B2 | 7/2015 | Mashatan et al. | |
| 9,094,206 B2* | 7/2015 | Di Crescenzo | H04L 63/0869 |
| 9,425,967 B2* | 8/2016 | Tseng | H04L 9/3268 |
| 2006/0064489 A1* | 3/2006 | Hars | H04L 41/0806 709/226 |
| 2007/0061266 A1* | 3/2007 | Moore | G06Q 50/00 705/51 |
| 2008/0027602 A1* | 1/2008 | Yeap | B60R 25/04 701/31.4 |
| 2008/0232595 A1* | 9/2008 | Pietrowicz | G06Q 20/3829 380/277 |
| 2008/0235509 A1* | 9/2008 | Laberteaux | H04L 9/006 713/156 |
| 2008/0270013 A1* | 10/2008 | Ishikawa | G01C 21/28 701/117 |
| 2009/0046854 A1* | 2/2009 | Di Crescenzo | H04L 9/002 380/44 |
| 2009/0235071 A1* | 9/2009 | Bellur | H04L 9/3268 713/158 |
| 2009/0259841 A1* | 10/2009 | Laberteaux | H04L 63/0823 713/156 |
| 2009/0260057 A1* | 10/2009 | Laberteaux | H04L 63/0823 726/2 |
| 2010/0164706 A1* | 7/2010 | Jeng | B60Q 9/007 340/459 |
| 2010/0164719 A1* | 7/2010 | George | G08B 25/009 340/541 |
| 2011/0083011 A1* | 4/2011 | DiCrescenzo | H04L 9/006 713/158 |
| 2011/0191581 A1* | 8/2011 | Shim | H04L 67/12 713/158 |
| 2011/0224893 A1* | 9/2011 | Scofield | G01C 21/3492 701/119 |
| 2013/0067220 A1* | 3/2013 | Ando | H04L 9/3268 713/156 |
| 2013/0340064 A1 | 12/2013 | Kostiainen et al. | |
| 2014/0006777 A1* | 1/2014 | Amiri | H04L 63/0823 713/158 |
| 2015/0046710 A1* | 2/2015 | Clish | H04L 9/3273 713/169 |
| 2015/0156215 A1 | 6/2015 | Van Den Berg et al. | |
| 2015/0197196 A1* | 7/2015 | Lin | B60Q 9/008 340/436 |
| 2015/0256346 A1* | 9/2015 | Tseng | H04L 9/3265 713/158 |
| 2016/0195602 A1* | 7/2016 | Meadow | G01S 5/10 701/517 |
| 2016/0285863 A1* | 9/2016 | Canavor | H04L 63/0823 |
| 2016/0285864 A1* | 9/2016 | Canavor | H04L 63/0823 |

FOREIGN PATENT DOCUMENTS

| | | |
|---|---|---|
| EP | 2916518 A1 | 9/2015 |
| TW | I472949 | 2/2015 |
| WO | WO2011/044323 A1 | 4/2011 |

OTHER PUBLICATIONS

Bhargav Bellur, "Certificate Assignment Strategies for a PKI-based Security Architecture in a Vehicular Network." *IEEE "GLOBECOM" 2008 proceedings* (6 pgs.).

Chenxi Zhang, et al., "An Efficient Message Authentication Scheme for Vehicular Communications." *IEEE Transactions on Vehicular Technology*, vol. 57, No. 6, Nov. 2008, pp. 3357-3368.

Panagiotis (Panos) Papadimitratos, et al., "Certificate Revocation List Distribution in Vehicular Communication Systems." *VANET'08*, Sep. 15, 2008, San Francisco, California, USA, pp. 86-87.

Peifang Zheng, "Tradeoffs in Certificate Revocation Schemes." *ACM SIGCOMM Computer Communications Review*, vol. 33, No. 2, pp. 103-112, Apr. 2003.

Xiaodong Lin, et al., "Security in Vehicular Ad Hoc Networks." *IEEE Communications Magazine*, Apr. 2008, pp. 88-95.

IEEE Standard for Wireless Access in Vehicular Environments—Security Services for Applications and Management, IEEE Std 1609.2-2013, Standard by IEEE, Apr. 26, 2013 (17 pgs.).

Walton Fehr, Security Credential Management System Design—Security system design for cooperative vehicle-to-vehicle crash avoidance applications using 5.9 GHz Dedicated Short Range Communications (DSRC) wireless communications, Draft Report—Apr. 13, 2012, ITS Joint Program Office, Research and Innovative Technology Administration, U.S. Department of Transportation (93 pgs.).

ETSI TS 103 097 V1.1.1 (Apr. 2013), "Intelligent Transport Systems (ITS); Security; Security header and certificate formats." (33 pgs.).

* cited by examiner

SECURITY CERTIFICATE MANAGEMENT METHOD FOR A VEHICULAR NETWORK NODE AND VEHICULAR NETWORK NODE APPLYING THE SAME

This application claims the benefit of Taiwan application Serial No. 105109055, filed Mar. 23, 2016, the subject matter of which is incorporated herein by reference.

TECHNICAL FIELD

The technical field relates in general to a security certificate management method for a vehicle network node and a vehicle network node using the same.

BACKGROUND

The intelligent transportation system (ITS) employs advanced technologies such as electronic, communication, computer, control and sensing technologies on various types of transportation systems (particularly, the land transport). Through real-time data transfer, the intelligent transportation system can improve the safety, efficiency, service, monitoring and management of transportation, and resolve traffic problems such as congestion and delay. The intelligent transportation system can achieve maximum effectiveness when the transportation resources are limited.

In the intelligent transportation system, a vehicle is equipped with an on-board unit (OBU). If the vehicle is equipped with a wireless communication device, the on-board unit and the wireless communication device can either be integrated as one device or separated as two independent devices. Regardless of the on-board unit and the wireless communication device being integrated or separated, the on-board unit transmits and receives a message via the wireless communication device. When the vehicle moves on the road, the vehicle can exchange or transmit the message to an adjacent vehicle and/or an adjacent road-side unit (RSU) through the on-board unit and the wireless communication device. The public-key infrastructure (PKI) can be used so that the message received by the on-board unit and the road-side unit are correct.

In the PKI architecture, a certificate authority (CA) generates multiple public-private key pairs. The certificate authority, using its own private key, generates a corresponding signature for each public key. The certificate can include the signature and the certificate relevant information (such as the expiry date of the certificate). For privacy protection, the certificate authority generates one or more certificates dedicated to an on-board unit, and there is no relevance between the certificates dedicated to the same on-board unit. The generated certificate(s) dedicated to the same on-board unit does not contain any authentic ID which may be used for identifying/linking the OBU.

Before a certificate expires, if the scope of use of the certificate changes or the relevance between the certificate and the certificate authority (CA) changes, or the certificate or the private key in the certificate is compromised, then the certificate authority must revoke the certificate before the expiry date matures, and inform system user of a certificate revocation list (CRL).

Therefore, it has become a prominent task to provide a method for managing a security certificate of a vehicle network node and the vehicle network node using the same to effective manage security certificate of the vehicle network node.

SUMMARY

The disclosure is directed to a security certificate management method for a vehicle network node and the vehicle network node using the same. The vehicle network node checks whether the certificate included in the message transmitted by other vehicle network node within a certain region (for example, but not limited by, the communication range of the vehicle network node) has been revoked or not, and generates a regional certificate revocation list for other vehicle network nodes within the certain region.

According to one embodiment of the disclosure, a security certificate management method for a vehicle network node of a vehicle network is provided. A message is received. Whether a certificate of the message has been revoked is checked. If the certificate has been revoked, then a regional certificate revocation list is generated or updated according to the certificate, and the updated regional certificate revocation list is transmitted within a communication range.

According to another embodiment of the disclosure, a vehicle network node used in a vehicle network is provided. The vehicle network node includes a communication unit, a processing unit and a storage unit. The communication unit receives a message. The message processing unit checks whether a certificate of the message has been revoked. If the certificate has been revoked, then the message processing unit generates or updates a regional certificate revocation list according to the certificate, and transmits the updated regional certificate revocation list within a communication range. The storage unit stores the regional certificate revocation list.

The above and other contents of the invention will become better understood with regard to the following detailed description of the preferred but non-limiting embodiment(s). The following description is made with reference to the accompanying drawings.

DETAILED DESCRIPTION

Technical terms are used in the specification with reference to generally-known terminologies used in the technology field. For any terms described or defined in the specification, the descriptions and definitions in the specification shall prevail. Each embodiment of the disclosure has one or more technical characteristics. Given that each embodiment is implementable, a person ordinarily skilled in the art can selectively implement or combine some or all of the technical characteristics of any embodiment of the disclosure.

Figure 1:
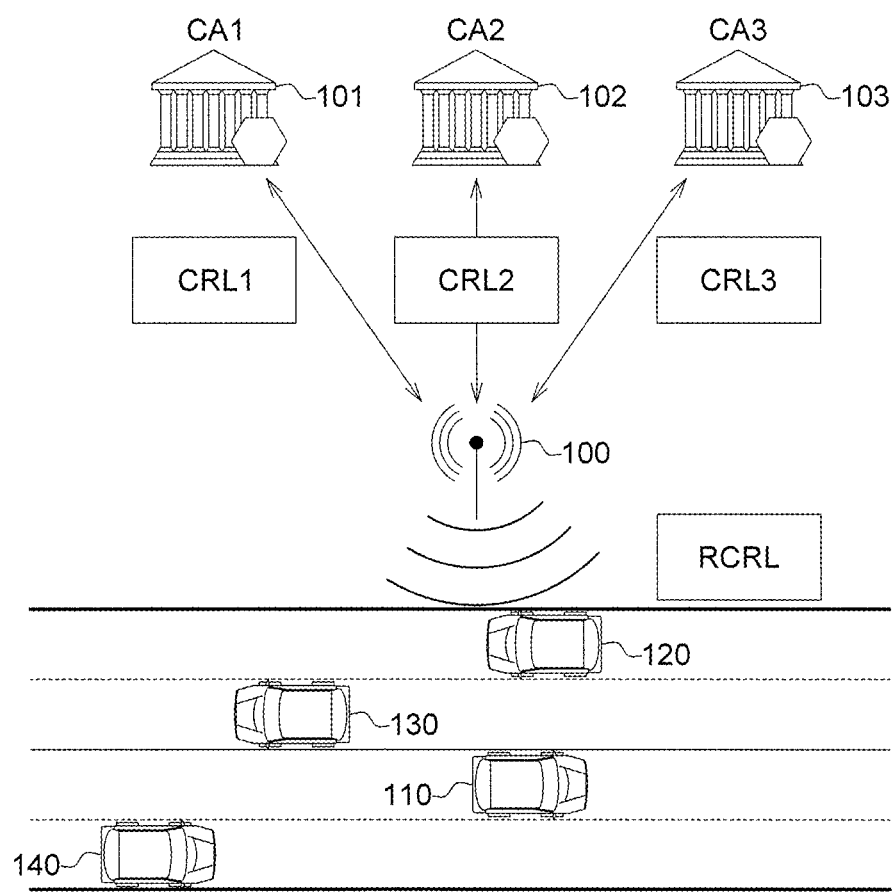
FIG. 1 shows a schematic diagram of a vehicle network according to an embodiment of the disclosure.

Refer to FIG. 1, a schematic diagram of a vehicle network according to an embodiment of the disclosure is shown. As indicated in FIG. 1, the vehicle network node 100 receives one or more certificate revocation lists (CRL) (CRL1~CRL3) sent from one or more certificate authorities (CA) (CA1 101~CA3 103) of the certificate authority (CA) list. The vehicle network node 100 may regularly or irregularly download and/or update the certificate revocation lists (CRL1~CRL3) from the certificate authorities (CA1 101~CA3 103). The vehicle network node 100 generates a global certificate revocation list (GCRL) from the certificate revocation lists. The vehicle network node 100 generates a regional certificate revocation list (RCRL) applicable to the communication range of the vehicle network node 100 according to the global certificate revocation list and the certificate information of the message(s) transmitted by other vehicle network nodes (such as the vehicle network nodes 110~140) within the communication range of the vehicle network node 100. The regional certificate revocation list includes the certificate ID of the revoked certificate and other relevant information (such as recording time). The vehicle network node 100 and the vehicle network nodes 110~140 form a vehicle network.

The vehicle network node 100 may be realized by a road-side unit (RSU) or a vehicle equipped with an on-board unit (OBU). The vehicle network node 100 may use the embodiment of the disclosure. In the embodiment, the wireless communication device is integrated in the on-board unit, and therefore the on-board unit has a wireless communication function. The vehicle network nodes 110~140 may be realized by the road-side units (RSUs), or the vehicles equipped with on-board units. The vehicle network nodes 110~140 may use the embodiment of the disclosure. In the descriptions below, the vehicle network node 100 is exemplified by the road-side unit, and the vehicle network nodes 110~140 are exemplified by the vehicles equipped with the respective on-board units. In other possible embodiments of the disclosure, motorcycles, bicycles or pedestrians may also be equipped with OBUs and used as vehicle network nodes. That is, in the descriptions below, the objects (such as vehicles, motorcycles, bicycles or pedestrians) equipped with the OBUs are referred as the vehicle network nodes.

Figure 2:
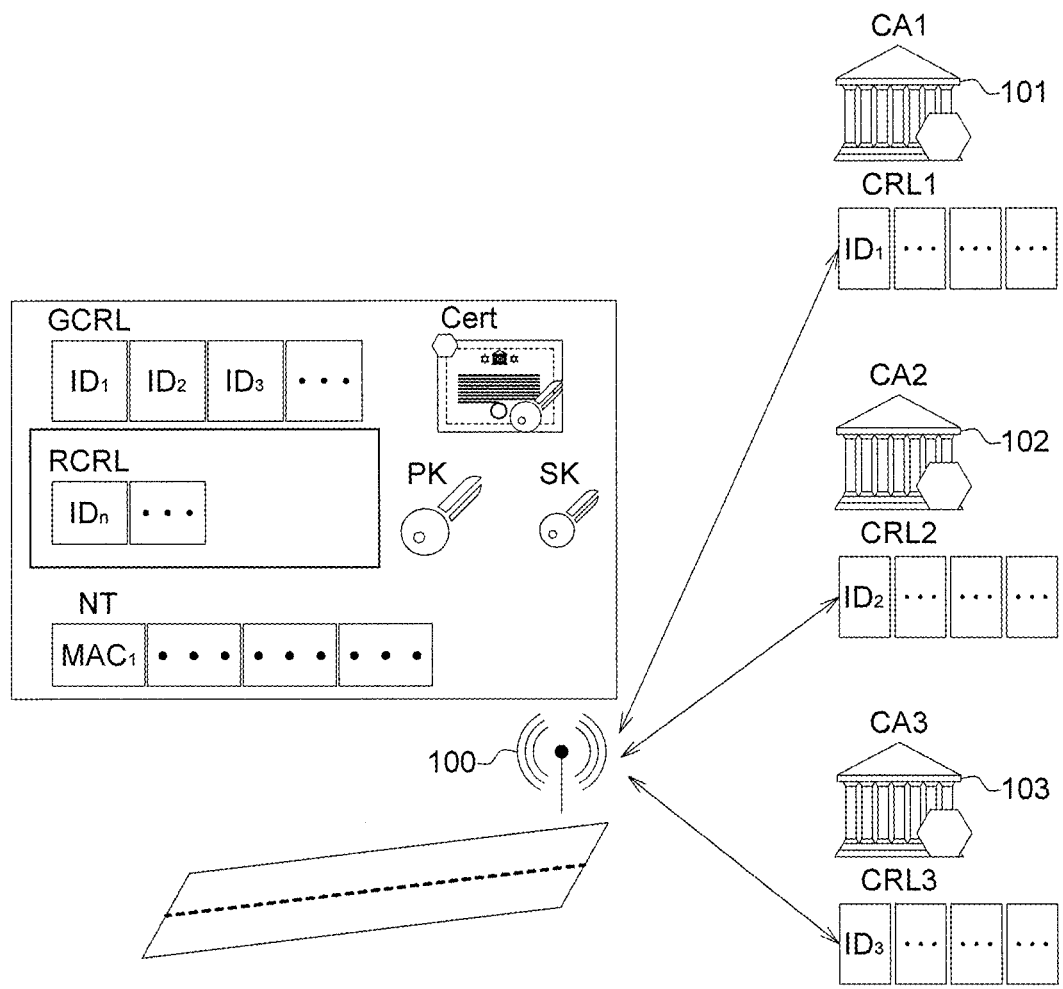
FIG. 2 shows an internal data structure of a vehicle network node.

FIG. 2 shows an internal data structure of the vehicle network node 100. As indicated in FIG. 2, the internal data structure of the vehicle network node 100 includes a global certificate revocation list (GCRL), a regional certificate revocation list (RCRL), a neighbor table (NT), and a certificate Cert. The global certificate revocation list is formed of the certificate revocation lists (CRL1~CRL3) received from the certificate authorities (CA1 101~CA3 103). The regional certificate revocation list records the certificate ID of the revoked certificate and/or other relevant information (such as recording time). The neighbor table (NT) records the relevant identification information of other vehicle network nodes within the communication range of the vehicle network node 100. Here, the relevant identification information is exemplified by the media access control (MAC) address which may be contained in the message(s) transmitted by other vehicle network nodes. The certificate Cert is legally issued by the CA. The vehicle network node 100 may sign and distribute the regional certificate revocation lists. In an embodiment, the vehicle network node 100 signs the regional certificate revocation list using the certificate (Cert), the private key SK and the public key PK associated to the certificate legally issued by the CA.

Based on the neighbor table, the vehicle network node 100 may determine whether there is/are any newly added vehicle network node(s) within the communication range of the vehicle network node 100. If there is/are any newly added vehicle network node(s) within the communication range, then the vehicle network node 100 transmits the regional certificate revocation list to the newly added vehicle network node.

Figure 3:
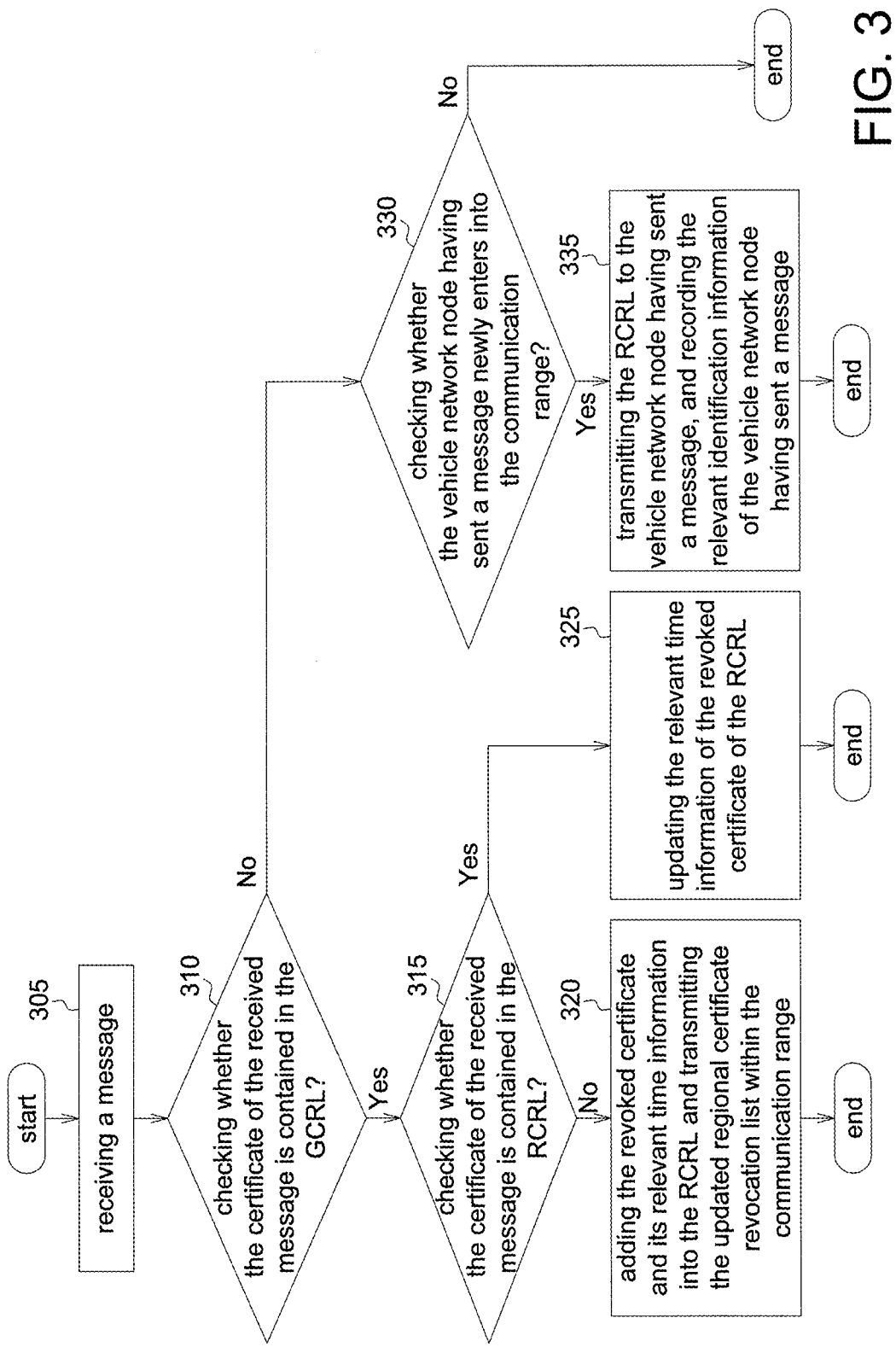
FIG. 3 shows a flowchart of the method for managing a vehicle security certificate according to an embodiment of the disclosure.

Details of the certificate management of the embodiment of the disclosure are disclosed below. Refer to FIG. 1, FIG. 3, and FIGS. 4A~4D. FIG. 3 shows a flowchart of a method for managing the vehicle security certificate according to an embodiment of the disclosure. FIGS. 4A~4D shows scenarios of the method for managing the vehicle security certificate according to an embodiment of the disclosure.

In step 305, the vehicle network node 100 receives a message from other vehicle network nodes (such as the vehicle network nodes 110~140). In step 310, the vehicle network node 100 checks whether the certificate of the received message is contained in the global certificate revocation list (that is, the vehicle network node 100 checks whether the certificate of the received message has been revoked). If the determination in step 310 is affirmative, then the method proceeds to step 315. In step 315, the vehicle network node 100 checks whether the revoked certificate is contained in the regional certificate revocation list.

If the determination in step 315 is negative, this implies that the revoked certificate has not yet been recorded in the regional certificate revocation list. The method proceeds to step 320. In step 320, the vehicle network node 100 adds the revoked certificate to the regional certificate revocation list, and transmits the updated regional certificate revocation list to the vehicle network nodes within the communication range. In the present embodiment, the (updated) certificate revocation list may be transmitted to one or more vehicle network node(s) or all vehicle network nodes within the communication range. To achieve better timing performance, the vehicle network node 100 may immediately transmit or broadcast the updated regional certificate revocation list to all vehicle network nodes within the communication range.

If the determination in step 315 is affirmative, this implies that the revoked certificate has already been recorded in the regional certificate revocation list. The method proceeds to step 325. In step 325, the relevant time information of the revoked certificate of the regional certificate revocation list is updated. That is, step 325 implies that the vehicle network node previously sending messages by using the revoked certificate is still within the communication range of the vehicle network node 100, and the vehicle network node still sends a message by using the revoked certificate. Therefore, in step 325 of the embodiment of the disclosure, the relevant time information of the revoked certificate is updated.

If the determination in step 310 is negative, then the method proceeds to step 330. In step 330, the vehicle network node 100 checks whether the vehicle network node having sent a message newly enters the communication range. The vehicle network node 100 checks whether the vehicle network node having sent a message newly enters into the communication range according to the relevant identification information such as the MAC address or the vehicle identification number (VIN). In step 330, the vehicle network node 100 checks whether the neighbor table contains the relevant identification information included in the received message. If the neighbor table does not contain any relevant identification information of the received message, then it is determined that the vehicle network node having sent the message newly enters into the communication range. Conversely, if the neighbor table contains the relevant identification information of the received message, then it is determined that the vehicle network node having sent the message is already within the communication range. If the determination in step 330 is negative, this implies that the certificate used by the vehicle network node having sent a message is valid, and the vehicle network node 100 has already transmitted the regional certificate revocation list to the vehicle network node having sent a message in advance (because the vehicle network node having sent a message is still within the communication range of the vehicle network node 100). Then, the flow terminates.

If the determination in step 330 is affirmative, this implies that the certificate used by the vehicle network node having sent a message is valid but the vehicle network node having sent a message newly enters into the communication range of the vehicle network node 100. Then, the method proceeds to step 335. In step 335, the vehicle network node 100 transmits the regional certificate revocation list to the vehicle network node having sent a message, and records the relevant identification information of the vehicle network node having sent a message (for example, the MAC address of the vehicle network node having sent a message is added to the neighbor table).

Figure 4A:
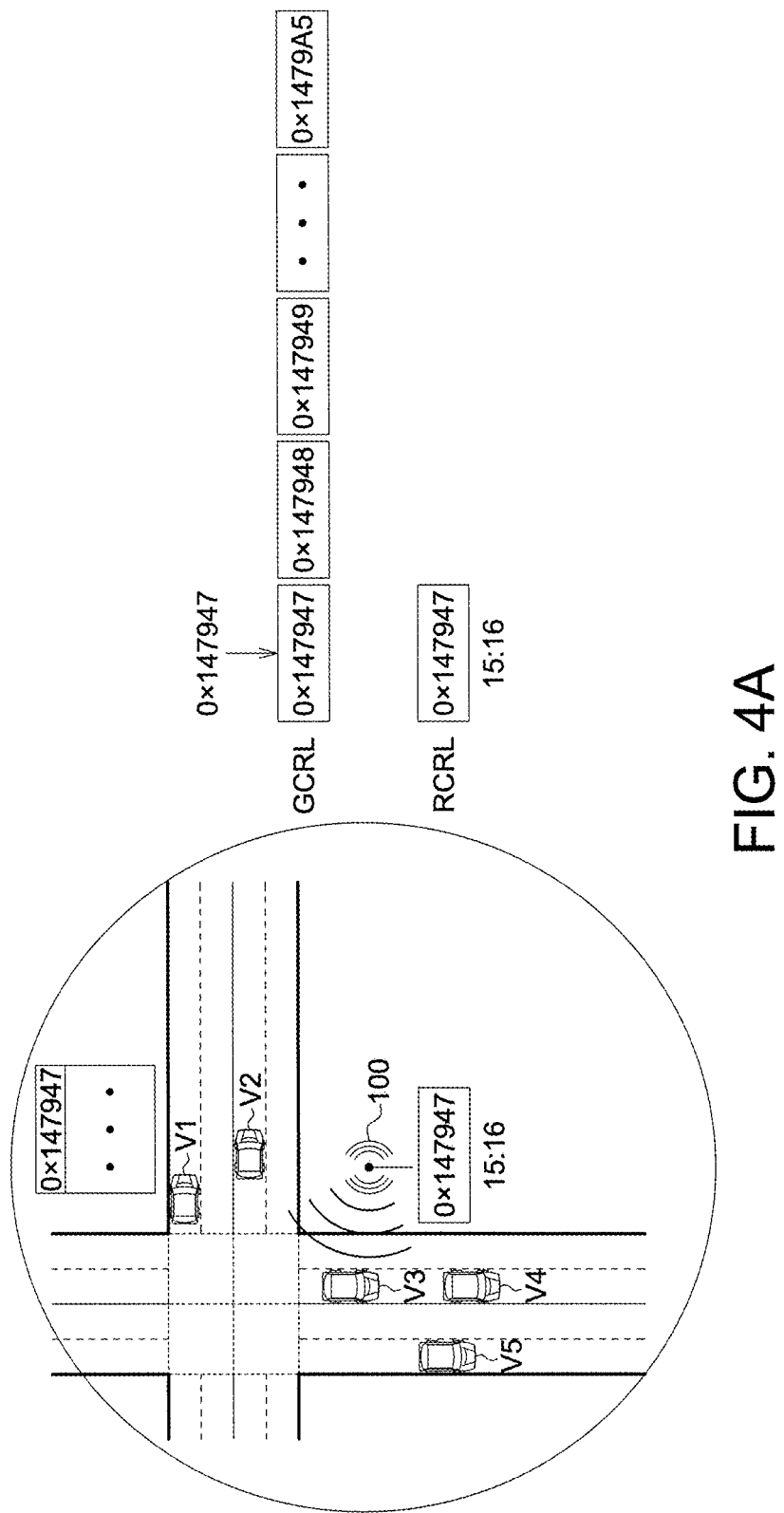
FIGS. 4A~4D shows scenarios of the vehicle security certificate management method according to an embodiment of the disclosure.

Refer to FIG. 4A to FIG. 4D. As indicated in FIG. 4A, at 15:16, the vehicle network node 100 detects that the vehicle V1 within the communication range sends a message, and the certificate ID (0x147947) used by the vehicle V1 is contained in the global certificate revocation list. Therefore, the vehicle network node 100 writes/updates the certificate ID (0x147947) and its relevant time message (15:16) to the regional certificate revocation list. Moreover, the vehicle network node 100 transmits the updated regional certificate revocation list, such that the updated regional certificate revocation list is received by all vehicles V1-V5 within the communication range of the vehicle network node 100.

Figure 4B:
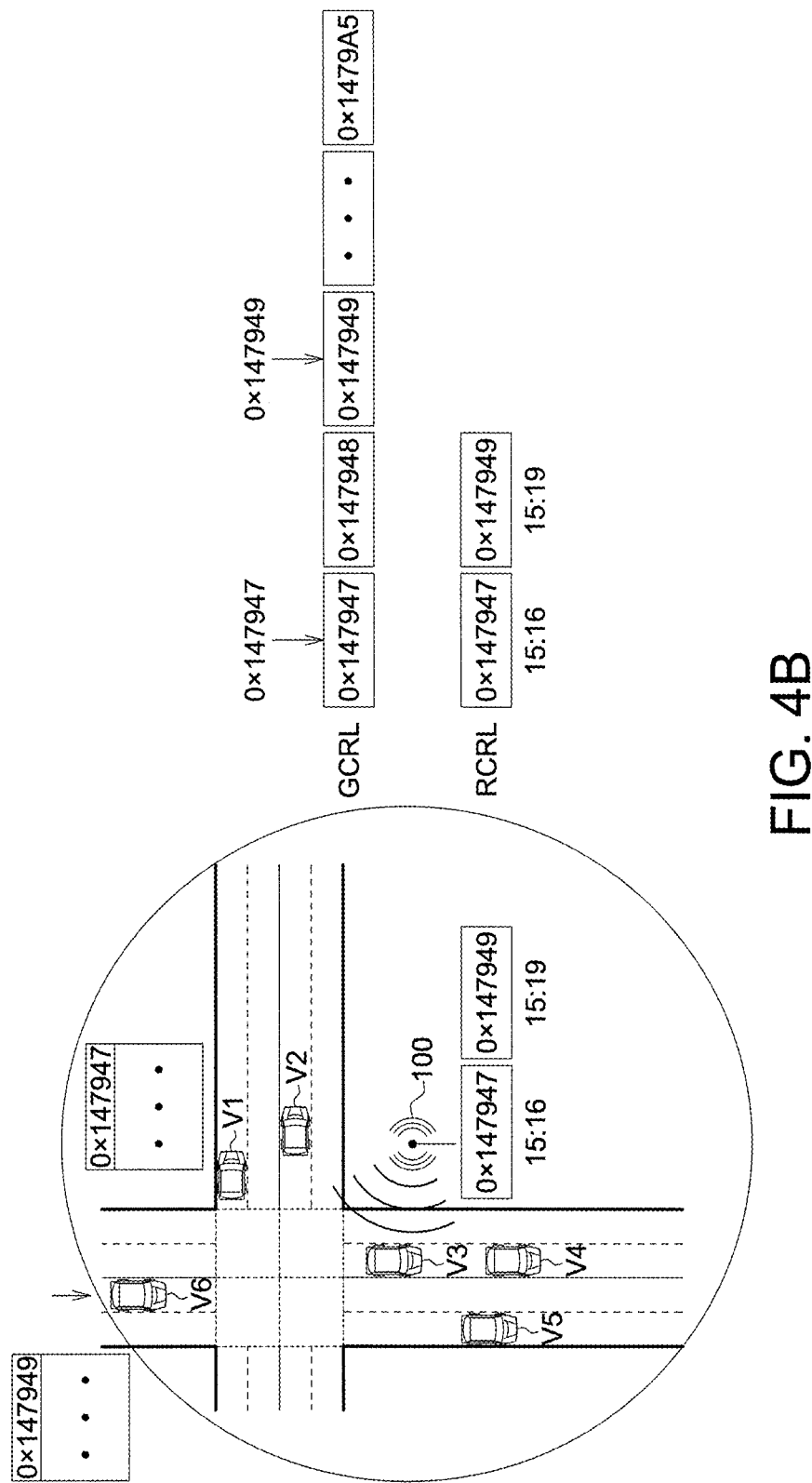

As indicated in FIG. 4B, at 15:19, the vehicle network node 100 detects that the vehicle V6 within the communication range sends a message, and the certificate ID (0x147949) used by the vehicle V6 is contained in the global certificate revocation list. Therefore, the vehicle network node 100 writes/updates the certificate ID (0x147949) and its relevant time message (15:19) to the regional certificate revocation list. Moreover, the vehicle network node 100 transmits the updated regional certificate revocation list, such that the updated regional certificate revocation list is received by all vehicles V1-V6 within the communication range of the vehicle network node 100.

Figure 4C:
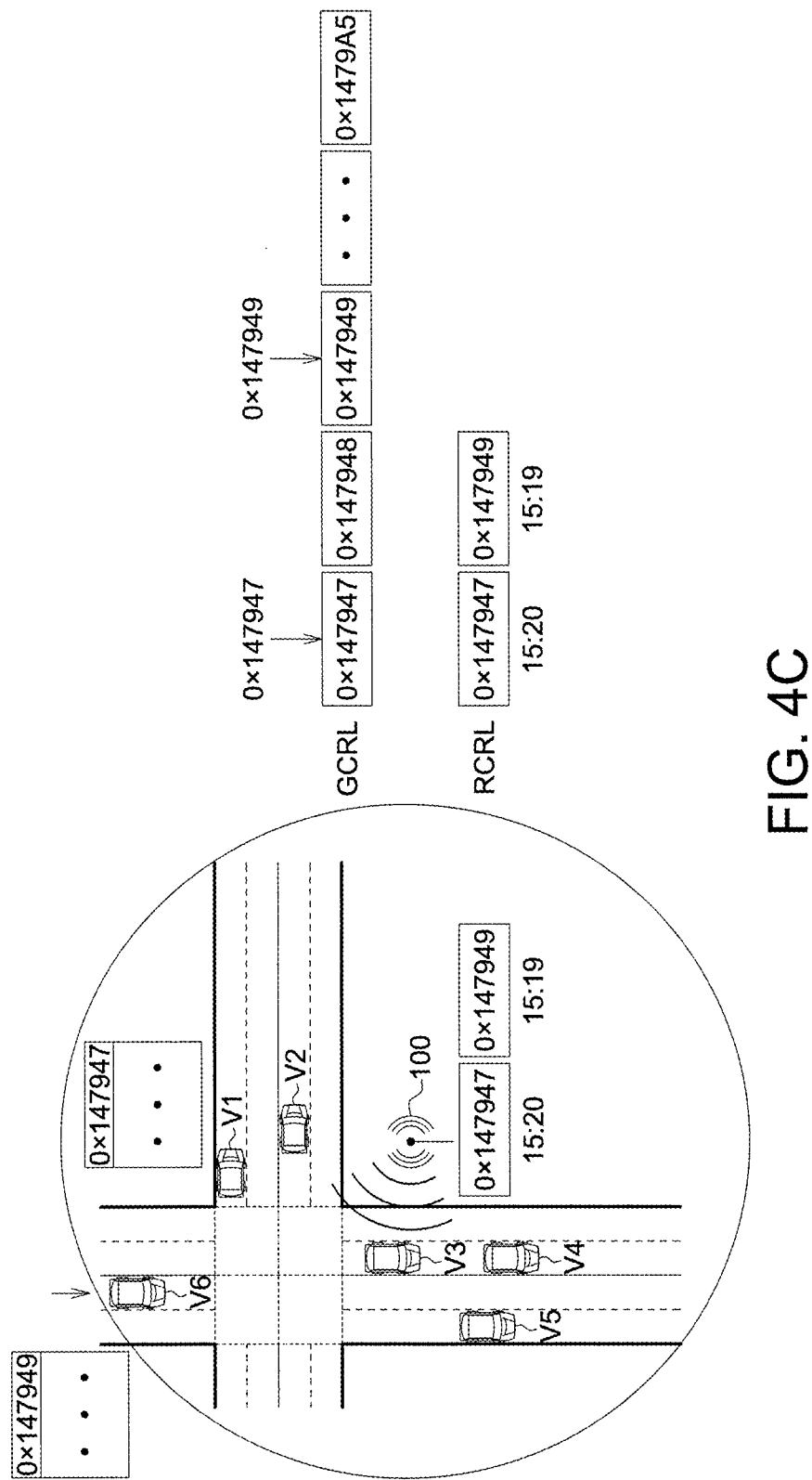

As indicated in FIG. 4C, at 15:20, the vehicle network node 100 detects that vehicle V1 within the communication range sends a message again. Since the certificate ID (0x147947) used by the vehicle V1 has already been contained in the global certificate revocation list and has been recorded in the regional certificate revocation list, the vehicle network node 100 updates relevant time information of the certificate ID (0x147947) of the vehicle V1 as 15:20.

Figure 4D:
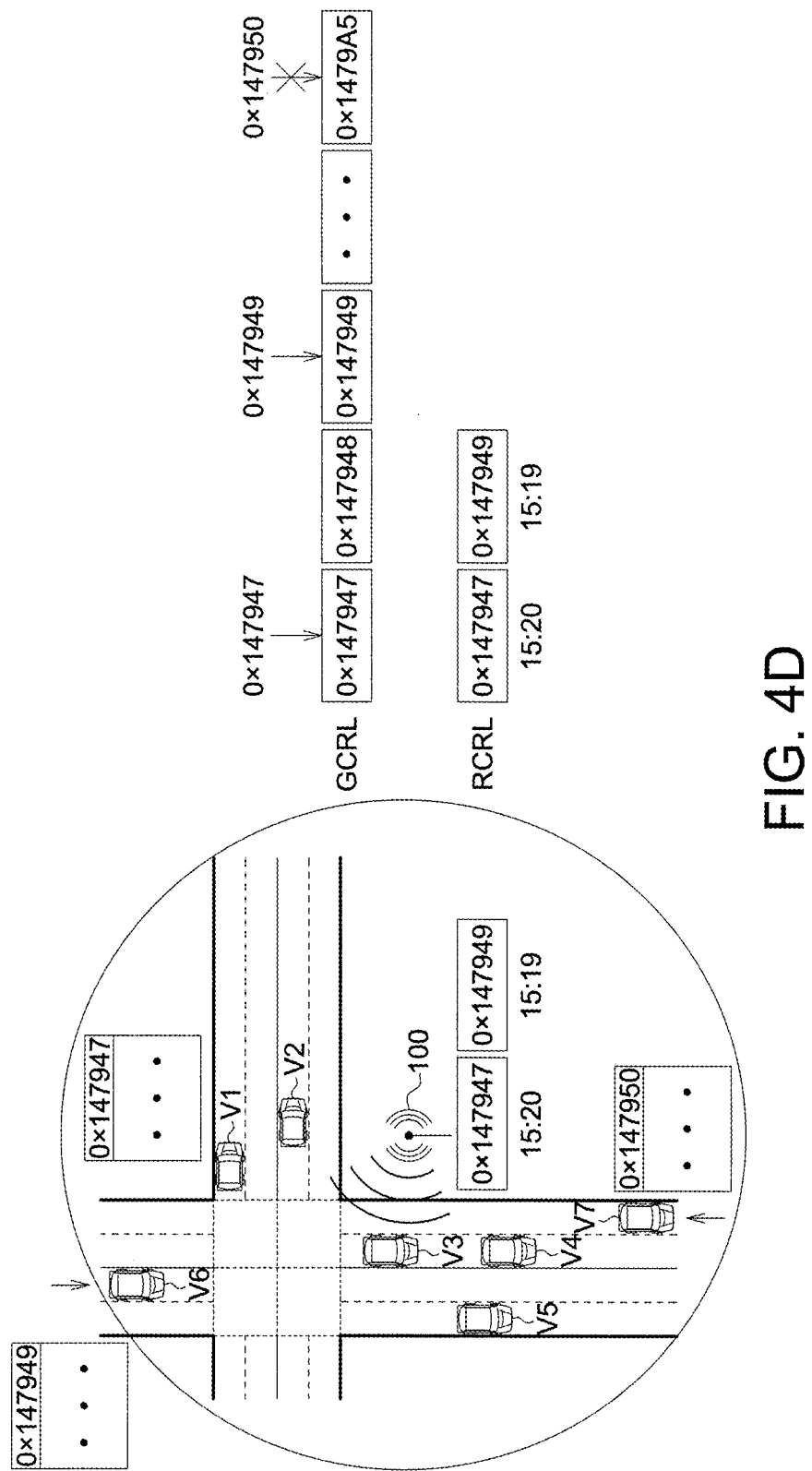

As indicated in FIG. 4D, the vehicle network node 100 detects that the vehicle V7 within the communication range newly arrives in the communication range. Since the certificate ID (0x147950) used by the vehicle V7 is not contained in the global certificate revocation list, the vehicle network node 100 transmits the regional certificate revocation list to the vehicle V7.

In an embodiment of the disclosure, the vehicles (such as vehicles V1-V7) receive the regional certificate revocation list from the vehicle network node 100. If the reception end (such as the vehicle V2) receives a message from the vehicle V1, the reception end checks whether the certificate used by the vehicle V1 expires or not (the certificate includes expiry date information). If the certificate has expired, then the reception end abandons the message received from the vehicle V1. If the certificate has not yet expired, then the reception end checks whether the certificate used by the vehicle V1 is legal based on the certificate from the certificate authority (that is, the reception end checks whether the certificate used by the vehicle V1 is legally issued by the certificate authority). If the certificate used by the vehicle V1 is illegal, then the reception end abandons the message received from the vehicle V1. If the certificate used by the vehicle V1 is legal, then the reception end checks whether the certificate used by the vehicle V1 is contained in the regional certificate revocation list. If the certificate used by the vehicle V1 is contained in the regional certificate revocation list, then the reception end abandons the message received from the vehicle V1. If the certificate used by the vehicle V1 is not contained in the regional certificate revocation list, then the reception end verifies the signature in the message received from the vehicle V1 according to the certificate contained in the message sent from the vehicle V1. If the signature verification does not pass, then the reception end abandons the message received from the vehicle V1. If the signature verification passes, then the reception end allows the communication with the vehicle V1 and receives the message sent from the vehicle V1.

In the above embodiment, the vehicle network node 100 transmits the complete regional certificate revocation list to the communication range. However, in other possible embodiments of the disclosure, the vehicle network node 100 may transmit the newly added content (not the complete copy) of the regional certificate revocation list to the communication range. As indicated in FIG. 4B, the vehicle network node 100 may transmit the newly added content (i.e. the certificate ID 0x147949 and its relevant time information (15:19)) of the regional certificate revocation list to the communication range. Thus, the amount of data transmission may be reduced.

In an embodiment of the disclosure, to avoid the data size of the regional certificate revocation list being too large, the regional certificate revocation list may be properly maintained. The maintenance includes, for example, deleting older certificate ID from the regional certificate revocation list or deleting the certificate ID of the vehicle having been out of the communication range.

For example, in an embodiment of the disclosure, a time threshold may be set (as a fixed time threshold). If the difference between the current time and a relevant time information of the certificate ID (such as the time 15:20 as indicated in FIG. 4C) is greater than the time threshold, this implies that the certificate ID contained in the regional certificate revocation list is older, and therefore may be deleted from the regional certificate revocation list.

In another possible embodiment of the disclosure, the time threshold is the quotient of a diameter of the communication range divided by an average speed of all vehicles within the communication range. If the difference between the current time and a relevant time information of the certificate ID (such as the time 15:20 as indicated in FIG. 4C) is greater than the time threshold, this implies that relevant vehicle may have left the communication range, and therefore the certificate ID may be deleted from the regional certificate revocation list.

The maintenance of the regional certificate revocation list may be executed regularly or irregularly, which is still within the scope of protection of the disclosure.

Figure 5:
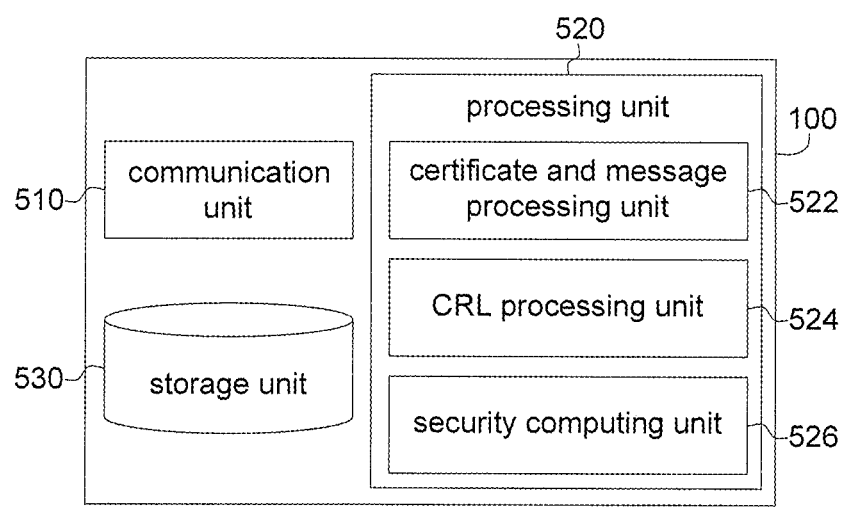
FIG. 5 shows a functional block diagram of a vehicle network node according to an embodiment of the disclosure.

FIG. 5 shows a functional block diagram of a vehicle network node according to an embodiment of the disclosure. The vehicle network node of FIG. 5 may be realized by the vehicle network node 100 of FIG. 1. As indicated in FIG. 5, the vehicle network node 100 includes a communication unit 510, a processing unit 520 and a storage unit 530. As an illustrative rather than a restrictive sense, the processing unit 520 may be realized by a controller or a processor such as a central processing unit; and the storage unit 530 may be realized by a memory, a hard disc or a solid state memory.

The communication unit 510 includes a long-distance network interface (such as a cable network, a long term evolution (LTE) technology or a 3G technology) for connecting to the Internet; and/or a vehicle network interface (such as Wi-Fi or a dedicated short range communications (DSRC)).

The processing unit 520 includes a certificate and message processing unit 522, a CRL processing unit 524 and a security computing unit 526. The certificate and message processing unit 522 checks the received message and the certificate to determine whether the MAC address of the received message represents a newly added vehicle and whether the certificate has been revoked. Detailed operations of the certificate and message processing unit 522 are disclosed above and the similarities are not repeated here. The CRL processing unit 524 regularly or irregularly updates and/or downloads the certificate revocation list from the certificate authority of the certificate authority list. Besides, the CRL processing unit 524 maintains the regional certificate revocation list and decides the distribution time of the regional certificate revocation list. The security computing unit 526 is for approving the certificate and verifying the signature, such as verifying the signature of the certificate revocation list of the CA and approving the distribution of the regional certificate revocation list.

The storage unit 530 stores the global certificate revocation list (GCRL), the regional certificate revocation list, the public key and the private key of the device and the certificate of the device.

In an embodiment of the disclosure, the vehicle network node 100 used for managing the regional certificate revocation list may also be referred as a master vehicle network node (or a vehicle network management node); and the vehicle network node (vehicles V1-V7 as indicated in FIGS. 4A~4D) which receive the regional certificate revocation list may also be referred as the slave vehicle network node (or the managed vehicle network node).

In an embodiment of the disclosure, a method for managing vehicle security certificate is provided. The method is used in a vehicle network. The method includes receiving a message; checking whether a certificate of the message has been revoked; and generating and/or updating a regional certificate revocation list according to the certificate and transmitting the updated regional certificate revocation list within a communication range if the certificate has been revoked.

The certificate revocation list released from one certificate authority may have a large data size. According to the current technology, normally, each vehicle network node may be connected to one or more certificate authorities to download the necessary certificate revocation list(s). Thus, when many vehicle network nodes concurrently or consecutively download the certificate revocation lists from their certificate authorities, instantaneous large data transmission may easily cause network congestion and further impede the communication of vehicle network.

To resolve the above problem, in an embodiment of the disclosure, the master vehicle network node (for example, the vehicle network node 100 of FIG. 1) downloads and/or updates the necessary certificate revocation list from certificate authorities, so the slave vehicle network nodes (for example, the vehicle network nodes 110~140 of FIG. 1) do not need to download the certificate revocation list from their certificate authorities. Hence, in an embodiment of the disclosure, instantaneous large data transmission and network congestion are avoided.

Furthermore, the master vehicle network node generates a regional certificate revocation list. As disclosed above, the certificate of the regional certificate revocation list is a revoked certificate used by the vehicle network node within the communication range. In comparison to the global certificate revocation list or the certificate revocation list downloaded from one certificate authority, the regional certificate revocation list has a small data size. Therefore, after the regional certificate revocation list is updated, the master vehicle network node still may immediately transmit the updated regional certificate revocation list to the transmission range, and instantaneous data transmission may be small and will not cause network congestion.

According to the current technology, if the refresh/update frequency of the certificate revocation list downloaded by the vehicle network node is not high enough, a window period may easily occur and cause security vulnerability. For example, if a certificate was revoked recently but a vehicle network node has not yet downloaded the latest updated certificate revocation list, then the vehicle network node does not know that the certificate has been revoked. If the vehicle network node receives the message using the recently revoked certificate, then the vehicle network node will not abandon the received message, and a security problem may occur.

Conversely, in an embodiment of the disclosure, if the master vehicle network node detects that the recently revoked certificate appears within the communication range, the master vehicle network node may immediately add the recently revoked certificate to the regional certificate revocation list, and immediately transmit the regional certificate revocation list having small data size to the slave vehicle network nodes within the communication range of the master vehicle network node. That is, in an embodiment of the disclosure, the regional certificate revocation list may be instantaneously updated or transmitted. Thus, the security of the slave vehicle network nodes within the communication range can be guaranteed.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A security certificate management method for a vehicle network node of a vehicle network, the security certificate management method including:
  receiving a message;
  checking, by a processor of the vehicle network node, whether a certificate of the message has been revoked, wherein the processor accesses a regional certificate revocation list from a memory of the vehicle network node and comparing the certificate of the message with the regional certificate revocation list to determine whether the certificate of the message has been revoked; and
  generating or updating the regional certificate revocation list stored in the memory according to the certificate by the processor of the vehicle network node and the processor controlling a communication circuitry of the vehicle network node to transmit the updated regional certificate revocation list within a communication range if the certificate has been revoked, wherein the vehicle network node is an on-board unit circuitry equipped on a vehicle and the regional certificate revocation list is applied to the communication range of the vehicle network node, wherein the security certificate management method further comprises:

checking whether a slave vehicle network node having sent the message newly enters into the communication range if the certificate of the message has not been revoked;

transmitting the regional certificate revocation list to the slave vehicle network node having sent the message, and recording a relevant identification information of the slave vehicle network node having sent the message if the slave vehicle network node having sent the message newly enters into the communication range; and determining whether a neighbor table comprises the relevant identification information of the slave vehicle network node having sent the message to determine whether the slave vehicle network node having sent the message newly enters into the communication range, and, wherein the relevant identification information includes a Media Access Control (MAC) address or a vehicle identification number (VIN).

2. The security certificate management method for the vehicle network node according to claim 1, wherein, whether the certificate of the message has been revoked is checked according to a global certificate revocation list.

3. The security certificate management method for the vehicle network node according to claim 2, further comprising:

downloading or updating a certificate revocation list from at least one certificate authority to generate or update the global certificate revocation list.

4. The security certificate management method for the vehicle network node according to claim 1, further comprising:

updating a relevant time information of the certificate of the regional certificate revocation list if the certificate has been revoked and the certificate is contained in the regional certificate revocation list.

5. The security certificate management method for the vehicle network node according to claim 1, further comprising:

adding the certificate and a relevant time information into the regional certificate revocation list and transmitting or broadcasting the regional certificate revocation list within the communication range if the certificate has been revoked but the certificate is not contained in the regional certificate revocation list.

6. The security certificate management method for the vehicle network node according to claim 1, further comprising:

determining whether to delete the certificate from the regional certificate revocation list according to a time difference between a current time information and a relevant time information of the certificate.

7. The security certificate management method for the vehicle network node according to claim 1, further comprising:

determining whether to delete the certificate from the regional certificate revocation list according to whether a slave vehicle network node having sent the message has already left the communication range.

8. The security certificate management method for the vehicle network node according to claim 7, further comprising:

determining whether the slave vehicle network node having sent the message has already left the communication range according to a time threshold, wherein, the time threshold relates to a diameter of the communication range and an average speed of all vehicle network nodes within the communication range.

9. A vehicle network node used in a vehicle network, the vehicle network node including:

a communication circuitry to receive a message;

a processing circuitry to check whether a certificate of the message has been revoked, wherein if the certificate has been revoked, then the processing circuitry generates or updates a regional certificate revocation list according to the certificate and transmits the updated regional certificate revocation list within a communication range; and a storage circuitry to store the regional certificate revocation list, wherein the processing circuitry accesses the regional certificate revocation list from the storage circuitry of the vehicle network node and compares the certificate of the message with the regional certificate revocation list to determine whether the certificate of the message has been revoked; and the processing circuitry generates or updates the regional certificate revocation list stored in the storage circuitry according to the certificate and the processing circuitry controlling the communication circuitry to transmit the updated regional certificate revocation list within the communication range if the certificate has been revoked, the vehicle network node is an on-board circuitry equipped on a vehicle and the regional certificate revocation list is applied to the communication range of the vehicle network node, if the processing circuitry determines that the certificate of the message has not been revoked, then the processing circuitry checks whether a slave vehicle network node having sent the message newly enters into the communication range, if the slave vehicle network node having sent the message newly enters into the communication range, then the processing circuitry transmits the regional certificate revocation list through the communication circuitry to the slave vehicle network node having sent the message and records a relevant identification information of the slave vehicle network node having sent the message, wherein the processing circuitry checks whether a neighbor table comprises the relevant identification information of the slave vehicle network node having sent the message to determine whether the slave vehicle network node having sent the message newly enters into the communication range, and the relevant identification information includes a Media Access Control (MAC) address or a vehicle identification number (VIN).

10. The vehicle network node according to claim 9, wherein, the processing circuitry checks whether the certificate of the message has been revoked according to a global certificate revocation list.

11. The vehicle network node according to claim 10, wherein, the communication circuitry downloads or updates a certificate revocation list from at least one certificate authority; and the processing circuitry generates or updates the global certificate revocation list.

12. The vehicle network node according to claim 9, wherein, if the processing circuitry determines that the certificate has been revoked and the certificate is contained in the regional certificate revocation list, then the processing circuitry updates a relevant time information of the certificate of the regional certificate revocation list.

13. The vehicle network node according to claim 9, wherein, if the processing circuitry determines that the certificate has been revoked and the certificate is not contained in the regional certificate revocation list, then the processing circuitry adds the certificate and a relevant time information into the regional certificate revocation list and transmits or broadcasts the regional certificate revocation list within the communication range.

14. The vehicle network node according to claim 9, wherein, the processing circuitry determines whether to delete the certificate from the regional certificate revocation list according to a time difference between a current time information and a relevant time information of the certificate.

15. The vehicle network node according to claim 9, wherein, the processing circuitry determines whether to delete the certificate from the regional certificate revocation list according to whether a slave vehicle network node having sent the message has already left the communication range.

16. The vehicle network node according to claim 15, wherein, the processing circuitry checks whether the slave vehicle network node having sent the message has already left the communication range according to a time threshold, which relates to a diameter of the communication range and an average speed of all vehicle network nodes within the communication range.

* * * * *